United States Patent [19]

Magnus et al.

[11] Patent Number: 5,238,991
[45] Date of Patent: Aug. 24, 1993

[54] VULCANIZABLE RUBBER COMPOSITION WITH IMPROVED DURABILITY

[75] Inventors: Fredrick L. Magnus, Mogadore; David A. Benko, Munroe Falls, both of Ohio

[73] Assignee: The Goodyear Tire & Rubber Company, Akron, Ohio

[21] Appl. No.: 701,733

[22] Filed: May 17, 1991

[51] Int. Cl.$^5$ ............................................. C08L 27/12
[52] U.S. Cl. ..................................... 524/520; 524/495; 524/496
[58] Field of Search ...................... 524/495, 596, 520

[56] References Cited

U.S. PATENT DOCUMENTS

| | | | |
|---|---|---|---|
| 3,002,938 | 10/1961 | Gagne | 260/4 |
| 3,223,676 | 12/1965 | Rucker | 260/11.5 |
| 3,517,722 | 6/1970 | Endter et al. | 152/359 |
| 3,600,309 | 8/1971 | Loser et al. | |
| 3,940,455 | 2/1976 | Kaufman | 260/888 |
| 4,075,158 | 2/1978 | Coale | 260/42.17 |
| 4,096,207 | 1/1978 | Saxon et al. | 260/900 |
| 4,215,178 | 7/1980 | Martin, Jr. | 428/421 |
| 4,605,696 | 8/1986 | Benko et al. | 524/432 |
| 4,965,152 | 10/1990 | Keys et al. | 430/1 |

FOREIGN PATENT DOCUMENTS 63-141808 6/1963 Japan.

OTHER PUBLICATIONS

Fluorad TM Coating Additives FC-430, FC-431 Product Information pub. by 3M, 1986, 3 pages.
Fluorad® Brand Coating Additives FC-430 and FC-431, Technical Information Pub. by 3M, 8 pages.
Modern Plastics International, Apr. 1983, p. 66.
Material Safety Data Sheet No. 1134, ICI Americas Inc., issued Jan. 24, 1990.

Primary Examiner—Paul R. Michl
Assistant Examiner—Edward Cain
Attorney, Agent, or Firm—Henry C. Young, Jr.; Louis F. Kreek, Jr.

[57] ABSTRACT

Vulcanizable rubber composition containing a polyfluoroethylene (PFE) and/or a polyfluoroethylene compatibilizer agent is added to a standard sidewall recipe. The PFE and/or PFE compatibilizers improve ozone resistance, improve flex fatigue properties and decrease the onset of vulcanization by increasing the rate of vulcanization. The new formula also represents a fast curing sidewall formulation.

9 Claims, 1 Drawing Sheet

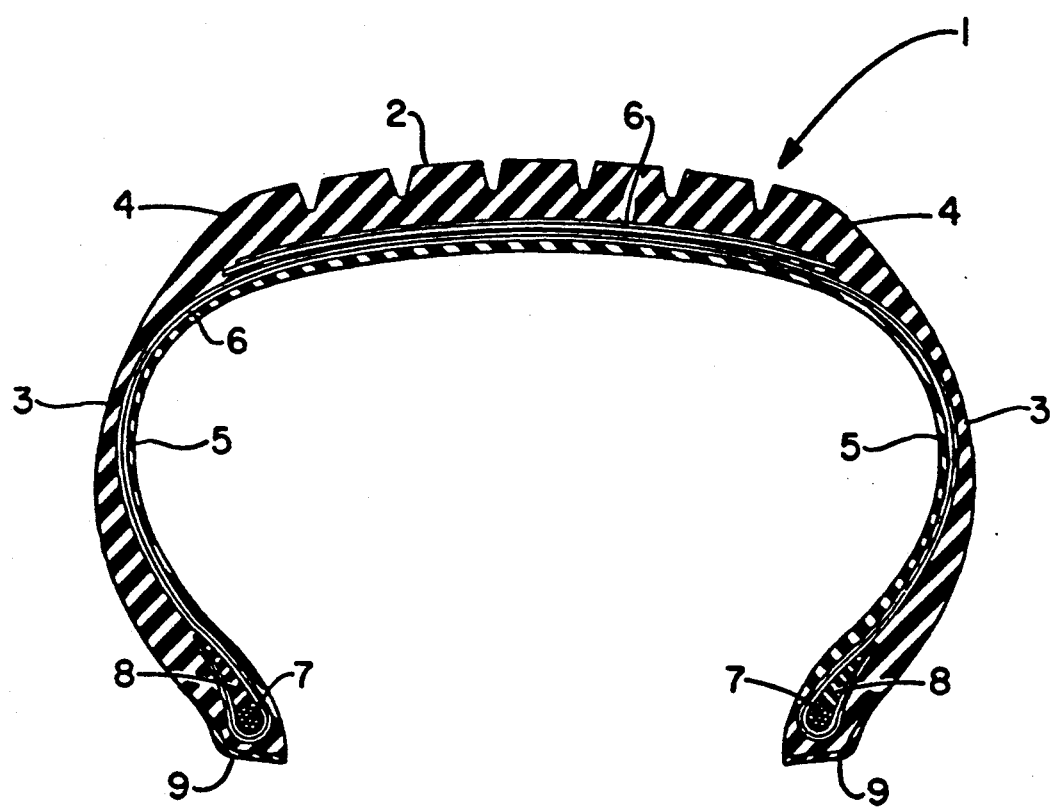

VULCANIZABLE RUBBER COMPOSITION WITH IMPROVED DURABILITY

TECHNICAL FIELD

This invention relates to vulcanizable rubber compositions and particularly to vulcanizable rubber compositions having improved durability, flex fatigue properties and ozone and oxygen resistance. These compositions are particularly useful as tire sidewall compositions.

BACKGROUND OF THE INVENTION

Vulcanized rubber compositions used in tires, belts, hoses and similar products are required to have good flex fatigue resistance and good oxidative stability, even in oxygen rich environments. Oxygen rich environments often lead to degradation processes induced by ozone and oxygen attack. In particular, certain tire components such as sidewalls, and the like, stay almost in untouched form through their life because their surfaces do not come in contact with objects such as road surfaces which tend to abrade rubber surfaces. Thus, these components are subject to degradation through oxidation and ozonation. These components have typically been made using formulations containing antidegradants that inhibit or prevent the degradation processes of oxygen and ozone attack.

A number of tire compositions have been formulated utilizing polymers of fluorinated ethylenes. In Japanese Patent 86 284 390, a composition is described which contains polyfluorinated ethylenes or polymers containing fluorinated olefin monomers to enhance the lubricating properties of the rim cushions so that tires can be mounted more easily without causing wear to the rim cushion and to reduce any detachment or tearing.

In a series of U.S. Pat. Nos. including 4,215,178, 4,075,158 and 4,965,152 compositions comprising given weights of polytetrafluoroethylene (PTFE) and molybdenum sulfide are disclosed for use in tire applications. These compositions require the presence of PTFE and molybdenum disulfide to achieve the advantages found in those compositions.

In U.S. Pat. No. 3,600,309, a composition is described for reducing die-plating and drag during rubber extrusion. This composition contains finely divided PTFE for use in a wide variety of elastomers to facilitate extrusion.

None of the above patents indicate that PTFE in a compatabilized format could aid in sidewall durability as it relates to ozone stability flex fatigue resistance.

SUMMARY OF THE INVENTION

The present invention relates to the use of at least one of a poly(fluoroethylene) (PFE) or a PFE compatibilizer to improve ozone and oxidative resistance and flex fatigue resistance of a vulcanized rubber.

The present invention according to one aspect relates to a vulcanizable rubber composition comprising 1) one or more diene containing polymers; 2) a sulfur vulcanizing agent or mixture thereof; 3) a package of other standard rubber compounding ingredients and 4) at least one of a PFE or a PFE compatibilizer where the amount of PFE and/or PFE compatibilizer is sufficient either to improve the durability, flex fatigue resistance, or oxidative stability of the rubber vulcanizate or to increase the rate of sulfur vulcanization.

This invention according to another aspect relates to a vulcanizate of the above vulcanizable rubber composition.

This invention according to a third aspect relates to a cured rubber article comprising a vulcanizate of the above vulcanizable rubber composition. This article can be for example, a rubber hose or a belt, but in a preferred embodiment is a pneumatic tire in which a portion, i.e., at least one component, and in particular, a tire sidewall, is composed of a composition according to this invention.

This invention according to a still further aspect relates to a pneumatic tire having at least one component which comprises a vulcanizate of the above rubber composition. In particular, at least one component which is exposed to air comprises the above vulcanizate. In a preferred embodiment, the sidewalls of the tire are composed of the above vulcanizate.

Rubber compounds for use in tires, belts and other types of rubber products, can contain a wide variety of different types of ingredients combined to form a final cured product. The final product is generally a highly crosslinked, highly filled rubber or rubber composite. Commonly, these rubber compounds are formulated by mixing together, under masticating conditions, ingredients including, but not restricted to, extender oils, bulk elastomers, fillers, antidegradants, curatives, cure activators, waxes and plasticizers. The final products are then generally cured thermally to yield a given product such as a tire, belt, hose or any other product containing cured rubber.

The inclusion into a standard vulcanizable rubber composition of at least one of a PFE or a PFE compatibilizer greatly improves durability, flex fatigue properties and ozone and oxygen resistance of the final composition making the composition ideal for sidewall and other similar tire components which need good ozone and oxygen resistance, good flex properties and excellent durability.

The vulcanizable rubber composition of the present invention comprises a diene containing elastomer or mixture of diene containing elastomers, at least one of a PFE or a PFE compatibilizer, a sulfur vulcanization agent, an antidegradant or mixture of antidegradants, a filler or mixture of fillers, an oil or mixture of oils, and zinc oxide. Besides the above enumerated components, it should be recognized that other ingredients can be added to the formulation as one of ordinary skill in the art would deem useful or necessary for a given application.

The PFE's of the present invention are polymers of one or more fluorinated ethylene monomers. These PFE's can be selected from the representative and illustrative group of polymers containing homopolymers and copolymers of fluorinated ethylene monomers selected from the group consisting of tetrafluoroethylene, vinyl fluoride, vinylidene fluoride, trifluoroethylene and chlorotrifluoroethylene. The preferred polymers are polytetrafluoroethylene (PTFE) and copolymers of tetrafluoroethylene and one or more of the above stated fluorinated ethylene monomers with PTFE being the most preferred.

The PFE polymers of particular utility are particulate PFE's having particle size of less than 6 microns ($6\mu$). Other particle sizes are usable. However, the small particle size PFE's are preferred because the smaller particles disperse better during the rubber mixing processes. The PFE's of the present invention can be fibrillating or non-fibrillating and can be chosen from any of the commercially available PFE polymers. One such particulate PFE is Polymist(tm) F-SA from Allied Signal, Inc. of Morristown, N.J., USA. However, other similar particulate PFE can be utilized with equal advantage including those available from Dupont such as Teflon ®.

The term, "PFE compatibilizer", as used herein denotes a material which is compatible with the diene rubber components and the PFE (polyfluoroethylene) components of compositions according to this invention and which improves compatibility between the PFE and the diene elastomer.

The PFE compatibilizer may be a fluorine-containing organic surfactant. One such fluorocarbon surfactant is Fluorad(tm) FC430 from 3M Company (Minnesota Mining and Manufacturing Company). "Fluorad(tm)" FC-430 is characterized by 3M as a nonionic surfactant of fluorinated alkyl esters and is further described by 3M as a viscous liquid, 100% active (i.e., no solvent), having a Brookfield viscosity at 25° C. (spindle #3 at 6 rpm) of 15,000 centipoises, a specific gravity of 1.15 at 25° C., a refractive index of 1.445 at 25° C., and a flash point above 300° F. (149° C.). U.S. Pat. No. 4,965,152 (to E.I. du Pont de Nemours and Company) characterizes "Fluorad" FC 430 as "liquid nonionic surfactant fluoroalphatic polymeric esters" and gives its CAS number as CAS-11114-17-3.

Another suitable PFE compatibilizer is "Solsperse" 13940, which is distributed in the United States by ICI Americas, Inc. of Wilmington, Del. This material is described in Material Safety Data Sheet (MSDS) No. 1134, issued Jan. 24, 1990, as a water insoluble liquid consisting of a polymeric fatty ester (40%) and a paraffinic solvent (60%) having a boiling point of 464°–500° F. (240°–260° C.), which is the same as the solvent boiling point, a specific gravity of 0.840, and a flash point of 96° C.

The PFE compatibilizer herein may be either a bulk material or a solution, but in either case is typically a liquid at ambient temperatures.

BRIEF DESCRIPTION OF THE DRAWINGS

The sole figure of drawing is a cross-sectional view of a vulcanized radial tire having one or more components whose composition is in accordance with this invention.

DETAILED DESCRIPTION OF THE INVENTION

Applicants have found that the addition of at least one of a PFE or a PFE compatibilizer yields rubber products and product components with excellent ozone and/or oxygen resistance, excellent flex fatigue resistance and excellent durability.

These improvements can be attained by the addition of at least one of a PFE or PFE compatibilizer to a standard vulcanizable rubber composition and in particular a standard tire sidewall recipe.

Typically, the PFE will range from about 0 to about 20 phr (parts by weight based on 100 parts of elastomer) and the PFE compatibilizer will range from about 0 to about 5 phr. Preferred compositions are those which contain a PFE compatibilizer. Preferably, the composition contains from about 0 to about 10 phr of PFE and/or from about 0.1 to about 5 phr of a PFE compatibilizer with 0.5 to about 2 phr of PFE compatibilizer being preferred.

The amount of PFE compatibilizer is sufficient to increase the rate of sulfur vulcanization. Typically, the PFE compatibilizer will range from about 0.1 to about 5 phr with from about 0.1 to about 3 phr being preferred and from about 0.5 to about 2 phr being particularly preferred. The exact mechanism for the enhanced cure rates is unknown.

The preferred PFE is PTFE (polytetrafluoroethylene). At least one of said PFE and said PFE compatibilizer must be present. The amount of PFE must be from about 1 to about 7 phr, preferably from about 1 to about 5 phr, when the PFE compatibilizer is absent. Compositions containing more than about 7 phr of PFE are prone to cracking when PFE compatibilizer is absent. The minimum amount of PFE compatibilizer must be at least about 0.1 phr when PFE is absent.

The term, "diene containing polymer" includes conventional rubbers or elastomers such as natural rubber (cis-1,4-polyisoprene) and all its various raw and reclaimed forms as well as various synthetic unsaturated or partially unsaturated rubbers, i.e., rubber polymers of the type which may be vulcanized with sulfur. Representative of synthetic polymers are the homopolymerization products of butadiene and its homologues and derivatives, for example, methyl-butadiene (including synthetic cis-1,4-polyisoprene), dimethylbutadiene and pentadiene as well as copolymers such as those formed from a butadiene or its homologues or derivatives with other unsaturated organic compounds. Among the latter are olefins, for example, ethylene, propylene or isobutylene which may be copolymerized with isoprene to form polyisobutylene, also known as butyl rubber; vinyl compounds, for example vinyl chloride, acrylic acid, acrylonitrile (which polymerizes with butadiene to form NBR), methacrylonitrile, methacrylic acid, alpha-methylstyrene and styrene, the latter compound polymerizing with butadiene to form SBR, as well as vinyl esters and various unsaturated aldehydes, ketones and ethers, e.g., acrolein and vinyl ethyl ether. Also included are the various synthetic rubbers prepared from the homopolymerization of isoprene and the copolymerization of isoprene with other diolefins and various unsaturated organic compounds. Also included are the synthetic rubbers such a cis-1,4-polybutadiene and cis-1,4-polyisoprene and similar synthetic rubbers which have been developed in recent years, such as EPDM (elastomer made from ethylene-propylene-diene monomer). Such recently developed rubbers include those that have polymer bound functionalities such as antioxidants and antiozonants. These polymer bound materials are known in the art and can have functionalities that provide antidegradative properties, synergism, and other properties.

The preferred diene containing polymers for use in the present invention include natural rubber (which is cis-1,4-polyisoprene), polybutadiene, synthetic polyisoprene, styrene/butadiene copolymers, isoprene/butadiene, NBR (nitrile-butadiene rubber), terpolymers of acrylonitrile, butadiene and styrene and blends thereof.

A rubber composition of the present invention may also contain in situ generated resorcinol-formaldehyde (RF) resin (in the vulcanized rubber/textile matrix) by compounding a vulcanizing rubber stock composition with the phenol/formaldehyde condensation product (hereinafter referred to as the "in situ method"). The components of the condensation product consist of a methylene acceptor and a methylene donor. The most common methylene donors include N-(substituted oxymethyl) melamine, hexamethylenetetramine or hexamethoxymethylmelamine. A common methylene acceptor is a dihydroxybenzene compound such as resorcinol or a resorcinol ester. The RF resin increases the stiffness of the rubber and promotes adhesion of the rubber to a reinforcing material when present. The in situ method has been found to be particularly effective where the reinforcing material is brass coated steel wire, since pretreatment of the wire with the RF system has been observed to be largely ineffective. In situ generated RF resins of this type are disclosed in U.S. Pat. No. 3,517,722 (methylene acceptor may be resorcinol) and U.S. Pat. No. 4,605,696 (methylene acceptor is a resorcinol ester).

The vulcanizable rubber composition of the present invention contains a sulfur vulcanizing agent or mixture thereof (i.e., a sulfur vulcanization package). Examples of suitable sulfur vulcanizing agents include elemental sulfur or one or more sulfur donating vulcanizing agents, for example, an amine disulfide, polymeric polysulfide or sulfur olefin adduct.

The amount of sulfur vulcanizing agent or mixture thereof will vary depending on the type of rubber and the particular type of sulfur vulcanizing agent that is used. Generally speaking, the amount of sulfur vulcanizing agent or mixture thereof ranges from about 0.1 to about 10 phr with the range of from about 0.5 to about 7 being preferred.

In addition to the above, other rubber additives may be incorporated in the sulfur vulcanizable material. The additives commonly used in rubber vulcanizates are, for example, fillers such as carbon black and/or silica and the like, tackifier resins, processing aids, antidegradants such as antioxidants and/or antiozonants, stearic acid, activators, waxes, oils such as paraffinic, naphthenic, aromatic or the like of mixtures thereof, and peptizing agents. As known to those skilled in the art, depending on the intended use of the sulfur vulcanizable material, certain additives mentioned above are commonly used in conventional amounts. A person of ordinary skill should recognize that one can add additional components to the formulation such as, but not limited to: carbon black fillers from about 0 to 200 phr; silica from about 0 to about 40 phr; oils from about 0 to 60 phr; resorcinol-formaldehyde (RF) system from about 0 to 10 phr; zinc oxide from about 0 to about 10 phr; tackifier resins from about 0 phr to about 20 phr; processing aids from about 0 phr to about 10 phr; antidegradants from 0 to about 20 phr (i.e., antioxidants from about 0 phr to about 10 phr and antiozonants from about 0 phr to about 10 phr) and fatty acids from about 0 phr to about 4 phr; waxes from about 0 phr to 5 phr; peptizers from about 0 phr to 1 phr; and retarder from 0 phr to 1 phr. The presence and relative amounts of the above additives are not a novel feature of the present invention and suitable amounts of these additives can be added at any desired level for a particular application.

Preferable levels of some of the above ingredients are listed below: fillers (carbon black and/or silica) from about 30 to about 100 phr; oils from about 10 to about 40 phr; and antidegradants from about 1 to about 10 phr. Carbon black is the preferred reinforcing filler except when a non-black rubber is required. Silica is the preferred filler for non-black rubbers.

Accelerators may be used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 phr to about 2.0 phr. Combinations of two or more accelerators may also be used at appropriate levels to accelerate vulcanization. Such combinations are known to be synergistic under appropriate conditions and one of ordinary skill in the art would recognize when their use would be advantageous and at what levels.

Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

Conventional rubber compounding techniques can be used to form compositions according to this invention. For example, rubber and desired additives (typically all except the accelerators and optionally zinc oxide) can be mixed together in a first mixing stage to form a masterbatch, and the accelerator(s) and zinc oxide (if not added previously) can be added in a second mixing stage to form a production mix, which is formed into the desired uncured rubber article or tire component.

Vulcanization temperatures may range from about 100° C. to 200° C. Preferably, the vulcanization is conducted at temperatures ranging from about 110° C. to 180° C. Any of the usual vulcanization processes may be used, such as heating in a press mold, heating with superheated steam or hot air or in a salt bath.

For further understanding of this invention, reference is made to the accompanying drawing.

In the drawings, components of the tire 1 as shown include a ground-contacting tread 2 and a pair of sidewalls 3 which abut the tread 2 in the shoulder regions 4. A fabric-reinforced rubber carcass 5 of generally toroidal shape and consisting of one or more plies supports the tread and sidewalls a circumferential fabric-reinforced belt 6 of one or more plies is positioned between the carcass 5 and the tread 2.

Tire 1 also includes a pair of spaced circumferentially extending bundled wire beads 7 which are substantially inextensible. Carcass 5 extends from one bead 7 to the other and the side edges may be wrapped around the beads as shown. Tire 1 may also include a pair of stiff apex components 8 of triangular cross section in the region of beads of and a pair of stiff chafer components 9 which are positioned in the bead region, basically between the respective beads 7 and the rim on which the tire is to be mounted. The apex components 8 and chafer components 9 add dimensional stability to the tire by resisting forces imparted to it during cornering.

The structure of tire 1 may be conventional. Tire 1 illustrated in the drawing is of conventional structure and has been simplified in the interest of clarity by omitting parts which are not required for an understanding of this invention.

One or more components of a tire 1 can be formed of a vulcanized rubber composition (or compound) in accordance with this invention. The remaining components can be of conventional composition(s). In a preferred embodiment, sidewalls 3 are composed of a composition containing a PFE and/or a PFE compatibilizer in accordance with this invention. Other tire components which are advantageously composed of a composition in accordance with this invention include tread 2 and chafer components 9. In general, any tire component that is exposed to air is advantageously formed of a composition of this invention. Non-tire rubber articles in which good flex fatigue resistance and/or good resistance to oxygen and/or ozone resistance are desirable can also be formed of a composition according to this invention. Such articles include, for example, rubber hoses, positive drive belts (e.g., fan belts and timing belts) and conveyor belts.

The objects and aspects of this invention are further described by the following illustrative examples.

The abbreviations shown in Table 1 below will be systematically used in the examples.

TABLE 1

Abbreviations phr—parts by weight per 100 parts of rubber
PFE—polyfluoroethylene
PFTE—polytetraflouroethylene
MB—masterbatch
ML—minimum rheometer torque
ts1—time to one point rise in torque
tc25—time to 25% cure
tc90—time to 90% cure
min.—minutes
pphm—parts per hundred million
dN-m—decanewton-meter
$\mu$—micron (or micrometer)

EXAMPLE 1

This example consists of a series of compounds having varying amount of a natural rubber, a synthetic rubber and a PTFE polymer having a particle size less than 6$\mu$ (Polymist ™ F-SA from Allied Chemical).

The rubber compositions of this example were all prepared using a two stage mix cycle. The first stage was a standard masterbatch mix stage and the second was a standard production mix stage (i.e., a mix stage used for forming test samples). The masterbatch mix stage included the components shown in Table 2 below.

TABLE 2

| Component(phr) | Masterbatch | | | | |
|---|---|---|---|---|---|
| | 1 | 2 | 3 | 4 | 5 |
| Natural rubber | 60 | 59.4 | 57 | 54 | 48 |
| Butadiene rubber | 40 | 39.6 | 38 | 36 | 32 |
| PTFE | — | 1 | 5 | 10 | 20 |
| Oil | 5 | 5 | 5 | 5 | 5 |
| Carbon black | 45 | 45 | 45 | 45 | 45 |
| Fatty acid | 1 | 1 | 1 | 1 | 1 |
| Zinc oxide | 2 | 2 | 2 | 2 | 2 |

The masterbatch (MB) compounds were allowed to cool and were mixed in the production stage mix with the other compounding components needed to make sulfur vulcanizable rubber compositions. The production mix included the following components shown in Table 3 below.

TABLE 3

| Component(phr) | Production Mix | | | | |
|---|---|---|---|---|---|
| | 1 | 2 | 3 | 4 | 5 |
| Masterbatch | 153 | 153 | 153 | 153 | 153 |
| Zinc oxide | 3 | 3 | 3 | 3 | 3 |
| Accelerator(s) | 2.1 | 2.1 | 2.1 | 2.1 | 2.1 |
| Sulfur | 0.64 | 0.64 | 0.64 | 0.64 | 0.64 |

The compounds were mixed in a laboratory scale Banbury type internal mixer. All masterbatch components were added and mixed for a standard time at a standard temperature and rotor speed that a person of ordinary skill in the art would utilize for a similarly constituted formulation. The productive mix stage was performed under standard production mix conditions that a person of ordinary skill in the art would utilize for a similarly constituted formulation.

Run 1 throughout the examples is a control composition. All production mix compositions other than run 1 represent test compositions, and all except runs 1,4 and 5 are in accordance with this invention.

The cure properties were obtained using a rheometer (Monsanto ODR-100). Ozone resistance data were obtained on cured strips of the compounds, using a modified ASTM 3395 test. Results are shown in Tables 4 and 5, respectively.

TABLE 4

| | Rheometer Cure Properties at 150° C. | | | | |
|---|---|---|---|---|---|
| Measurement | 1 | 2 | 3 | 4 | 5 |
| ML (dN-m) | 8.8 | 8.7 | 9.2 | 9.8 | 10.9 |
| ts1 (min.) | 6.4 | 6.2 | 5.9 | 5.6 | 5.4 |
| tc25 (min.) | 11.3 | 10.8 | 10.0 | 9.5 | 9.0 |
| tc90 (min.) | 18.2 | 17.1 | 15.7 | 15.4 | 14.6 |

TABLE 5

| | Ozone Testing Values(a) | | | | |
|---|---|---|---|---|---|
| Measurement | 1 | 2 | 3 | 4 | 5 |
| Dynamic* | 16 | 9 | 12 | F | F |
| Static | 9 | 9 | 6 | 6 | 0.5 |

(a). Values represent the crack density on the sample surface. The ozone level was set at an average concentration of 25 pphm for static and dynamic testing. (Modified ASTM 3395, using a cycled ozone on/off procedure).
*. The dynamic testing was performed at 21 days under cyclic deformation @ 25 phm average ozone concentration (Modified ASTM 3395)
F. Denotes failed.

The data show that addition of PTFE helps static ozone resistance but is detrimental to dynamic ozone resistance. In fact, the products in runs 4 and 5 failed. Static ozone testing was performed by placing a cured strip of the composition in an ozone chamber at 25% deformation, 100° F. (38° C.) and 25 pphm average ozone concentration. Dynamic ozone testing was performed in an ozone chamber under 25% cyclic deformation at an average ozone content of 25 pphm (parts per hundred million). Both are modified ASTM 3395 test procedures. These same ozone testing procedures (both dynamic and static are used throughout the examples herein.

The cure data showed a decrease in vulcanization time compared to the control (Run 1), as indicated by the steady decrease in ts1, tc25 and tc90.

EXAMPLE 2

This example consists of a series of compounds having varying amount of natural rubber, a synthetic rubber, PTFE and a PFE compatibilizer (Fluorad FC430 from 3M Company, a fluorocarbon surfactant).

The compound ingredients or components in phr for the mix stages were as shown below in Tables 6 and 7.

TABLE 6

| Component(phr) | Masterbatch (MB) | | | |
|---|---|---|---|---|
| | 1 | 6 | 7 | 8 |
| Natural rubber | 60 | 54 | 54 | 54 |
| Butadiene rubber | 40 | 36 | 36 | 36 |
| PTFE | — | 10 | 10 | 10 |
| Oil | 5 | 4 | 2.5 | 0 |
| Carbon black | 45 | 45 | 45 | 45 |

TABLE 6-continued

| | Masterbatch (MB) | | | |
|---|---|---|---|---|
| Component(phr) | 1 | 6 | 7 | 8 |
| Fatty acid | 1 | 1 | 1 | 1 |
| Zinc oxide | 2 | 2 | 2 | 2 |
| Fluorad FC-430 | 0 | 1 | 2.5 | 5.0 |

TABLE 7

| | Production Mix | | | |
|---|---|---|---|---|
| Component(phr) | 1 | 6 | 7 | 8 |
| Masterbatch | 153 | 153 | 153 | 153 |
| Zinc oxide | 3 | 3 | 3 | 3 |
| Accelerator(s) | 2.1 | 2.1 | 2.1 | 2.1 |
| Sulfur | 0.64 | 0.64 | 0.64 | 0.64 |

The data which were obtained on cure specimens of the above compounds are shown in Tables 8 and 9 below.

TABLE 8

| | Rheometer Cure Properties at 150° C. | | | |
|---|---|---|---|---|
| Measurement | 1 | 6 | 7 | 8 |
| ML (dN-m) | 8.8 | 9.9 | 9.9 | 10.6 |
| ts1 (min.) | 6.4 | 4.2 | 3.5 | 3.1 |
| tc25 (min.) | 11.3 | 6.6 | 5.5 | 4.6 |
| tc90 (min.) | 18.2 | 11.7 | 11.0 | 9.8 |

TABLE 9

| | Ozone Testing Values(a) | | | |
|---|---|---|---|---|
| Measurement | 1 | 6 | 7 | 8 |
| Dynamic* | 16 | 40 | 12 | F |
| Static | 9 | 9 | 0.5 | 0.5 |

Notes: See Table 5.

The cure showed a marked effect from the addition of the PFE compatibilizer Fluorad FC-430. The tc90 at the 5 phr level shortened by about eight minutes. The ozone data, although a little problematic, showed improved or equivalent dynamic ozone resistance.

EXAMPLE 3

This example consists of a series of compounds having varying amounts of natural rubber, a synthetic rubber and a PFE compatibilizer (Fluorad FC 430).

The compound ingredients or components in phr for the mix stages were as shown below in Tables 10 and 11.

TABLE 10

| | Masterbatch (MB) | | | |
|---|---|---|---|---|
| Component(phr) | 1 | 9 | 10 | 11 |
| Natural rubber | 60 | 60 | 60 | 60 |
| Butyl Rubber | 40 | 40 | 40 | 40 |
| PTFE | 0 | 0 | 0 | 0 |
| Oil | 5 | 4 | 2.5 | 0 |
| Carbon black | 45 | 45 | 45 | 45 |
| Fatty acid | 1 | 1 | 1 | 1 |
| Zinc oxide | 2 | 2 | 2 | 2 |
| Fluorad FC-430 | 0 | 1 | 2.5 | 5.0 |

TABLE 11

| | Production Mix | | | |
|---|---|---|---|---|
| Component(phr) | 1 | 9 | 10 | 11 |
| Masterbatch | 153 | 153 | 153 | 153 |
| Zinc oxide | 3 | 3 | 3 | 3 |
| Accelerator(s) | 2.1 | 2.1 | 2.1 | 2.1 |
| Sulfur | 0.64 | 0.64 | 0.64 | 0.64 |

The data which were obtained on cure specimens of the above compounds are shown in Tables 12 and 13 below.

TABLE 12

| | Rheometer Cure Properties at 150° C. | | | |
|---|---|---|---|---|
| Meaurement | 1 | 9 | 10 | 11 |
| ML (dN-m) | 8.8 | 8.4 | 8.0 | 9.3 |
| ts1 (min.) | 6.4 | 4.7 | 3.9 | 3.1 |
| tc25 (min.) | 11.3 | 7.8 | 6.2 | 4.9 |
| tc90 (min.) | 18.2 | 13.0 | 12.9 | 10.1 |

TABLE 13

| | Ozone Testing Values(a) | | | |
|---|---|---|---|---|
| Measurement | 1 | 9 | 10 | 11 |
| Dynamic* | 16 | 32 | 16 | 16 |
| Static | 9 | 9 | 0.5 | 4 |

Notes: See Table 5.

EXAMPLE 4

This example consists of a series of compounds having varying amounts of PFE compatibilizer (Solsperse 13940), in the presence of 10 phr of PTFE.

The compounding components which were used in this series are shown in Tables 14 and 15 below.

TABLE 14

| | Masterbatch | | |
|---|---|---|---|
| Component(phr) | 1 | 12 | 13 |
| Natural rubber | 60 | 54 | 54 |
| Butadiene rubber | 40 | 36 | 36 |
| PTFE | — | 10 | 10 |
| Solsperse 13940 | 0 | 1 | 5 |
| Oil | 5 | 4 | 0 |
| Carbon black | 45 | 45 | 45 |
| Fatty acid | 1 | 1 | 1 |
| Zinc oxide | 2 | 2 | 2 |

TABLE 15

| | Production mix | | |
|---|---|---|---|
| Component(phr) | 1 | 12 | 13 |
| Masterbatch | 153 | 153 | 153 |
| Zinc oxide | 3 | 3 | 3 |
| Accelerators | 2.1 | 2.1 | 2.1 |
| Sulfur | 0.64 | 0.64 | 0.64 |

The compounds were cured under standard conditions at 150° C. and tested in an ozone chamber for static and dynamic ozone resistance. The cure data and ozone data are shown in Tables 12 and 13.

TABLE 16

| | Rheometer Cure Properties at 150° C. | | |
|---|---|---|---|
| Measurement | 1 | 12 | 13 |
| ML (dN-m) | 8.8 | 9.3 | 11.2 |
| ts1 (min.) | 6.4 | 4.8 | 2.6 |
| tc25 (min.) | 11.3 | 7.8 | 3.7 |
| tc90 (min.) | 18.2 | 13.0 | 8.8 |

TABLE 17

| Ozone Testing Values(a) | | | |
| --- | --- | --- | --- |
| Measurement | 1 | 12 | 13 |
| Dynamic* | 16 | 4 | 4 |
| Static | 9 | 3 | 3 |

Notes: See Table 5.

The cure data clearly show a marked decrease in cure times, indicative of a fast cure composition, while the ozone data show substantial improvements in both static and dynamic ozone resistance.

While in accordance with the patent statutes, the best mode and preferred embodiment of the invention have been described, it is to be understood that the invention is not limited thereto, but rather is to be measured by the scope and spirit of the appended claims.

What is claimed is:

1. A vulcanizable rubber composition comprising:
   (a) 100 phr of a diene containing elastomer or mixture thereof;
   (b) a sulfur vulcanizing agent or mixture thereof;
   (c) about 1 to about 10 phr of a polyfluoroethylene, said polyfluoroethylene having a particle size not greater than about 6 microns; and
   (d) about 0.1 to about 5 phr of a polyfluoroethylene compatibilizer, said compatibilizer being a carbon compound or mixture thereof which is a liquid surfactant or dispersant and which is selected from the group consisting of
   (1) a non-ionic surfactant of fluoroaliphatic polymeric esters and
   (2) a water insoluble liquid consisting essentially of a polymeric fatty ester or mixture thereof and a paraffinic solvent;
   said compatibilizer improving compatibility between said elastomer or mixture thereof and said polyfluoroethylene;
   said composition being characterized by excellent ozone and oxygen resistance, flex fatigue resistance and durability.

2. A composition according to claim 1 wherein said polyfluoroethylene is polytetrafluoroethylene.

3. A composition according to claim 1 wherein said compatibilizer is a non-ionic surfactant of fluoroaliphatic polymeric esters.

4. A composition according to claim 3 wherein said non-ionic surfactant of fluoroaliphatic polymeric esters consists essentially of active ingredient and has a Brookfield viscosity at 25° (spindle No. 3 at 6 rpm) of 15,000 centipoises, a specific gravity of 1.15 at 25° C., a refractive index of 1.445 at 25° C. and a flash point above 300° F.

5. A composition according to claim 1 wherein said compatibilizer is a water insoluble liquid consisting essentially of a polymeric fatty ester or mixture thereof and a paraffinic solvent.

6. A composition according to claim 5 wherein said water insoluble liquid consists essentially of about 40% of said polymeric fatty ester and about 60% of said paraffinic solvent and has a boiling point of about 464°–about 500° F.

7. A vulcanizable rubber composition according to claim 2, wherein the amount of said compatibilizer is from about 1 to about 2.5 phr.

8. A pneumatic tire comprising components, including a tread, sidewalls and a carcass, wherein said sidewalls are composed of a vulcanizate of a composition of claim 1.

9. A pneumatic tire according to claim 8 wherein said composition further includes a filler or mixture thereof, wherein said filler or mixture thereof is selected from the group consisting of carbon black, silica and mixtures thereof.

* * * * *